(12) United States Patent
Chen et al.

(10) Patent No.: US 9,103,957 B2
(45) Date of Patent: Aug. 11, 2015

(54) BACK LIGHT MODULE AND DISPLAY DEVICE USING THE SAME

(71) Applicant: AU Optronics Corp., Hsin-Chu (TW)

(72) Inventors: Nan-Jui Chen, Hsin-Chu (TW); Chao-Heng Tu, Hsin-Chu (TW); Nan-Jui Chu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/264,300

(22) Filed: Apr. 29, 2014

(65) Prior Publication Data

US 2014/0334182 A1 Nov. 13, 2014

(30) Foreign Application Priority Data

May 7, 2013 (TW) .............................. 102116269 A (51) Int. Cl.
*F21V 8/00* (2006.01)
(52) U.S. Cl.
CPC ..................................... *G02B 6/0083* (2013.01)
(58) Field of Classification Search
USPC ........... 362/630, 631, 632, 634, 97.3; 349/58; 445/29
See application file for complete search history.

(56) References Cited

U.S. PATENT DOCUMENTS

| | | | | |
|---|---|---|---|---|
| 2007/0053176 A1* | 3/2007 | Chou | ............................... | 362/97 |
| 2008/0002392 A1* | 1/2008 | Kim | ................................ | 362/97 |
| 2008/0143920 A1* | 6/2008 | Back et al. | ....................... | 349/58 |
| 2008/0297701 A1 | 12/2008 | Lee et al. | | |
| 2009/0002595 A1* | 1/2009 | Kim | ................................. | 349/61 |
| 2009/0174838 A1* | 7/2009 | Park et al. | ........................ | 349/64 |
| 2009/0273919 A1* | 11/2009 | Park et al. | .................... | 362/97.1 |
| 2010/0165237 A1* | 7/2010 | Jung | ................................ | 349/58 |

FOREIGN PATENT DOCUMENTS

| TW | 201229422 A | 7/2012 |
|---|---|---|
| TW | M437972 U | 9/2012 |

OTHER PUBLICATIONS

Taiwan Patent Office, "Office Action", Feb. 9, 2015.

* cited by examiner

*Primary Examiner* — Laura Tso (74) *Attorney, Agent, or Firm* — WPAT, PC; Justin King (57) ABSTRACT

A back light module includes a bezel, a light source assembly and a first circuit board. The bezel has a carrier surface, a first back surface opposite to the first back surface, and a through hole passing through the bezel from the carrier surface to the first back surface. The light source assembly is disposed on the carrier surface, and the first circuit board is disposed on the first back surface. The light source assembly includes a second circuit board and a plurality of light emitting elements. The second circuit board is electrically connected to the first circuit board by its conductive pin set via the through hole. Since the light source assembly is electrically connected to the first circuit board by the conductive pin set, the assembly process is simplified and the cost is decreased. A display device using the back light module is also provided.

6 Claims, 7 Drawing Sheets

BACK LIGHT MODULE AND DISPLAY DEVICE USING THE SAME

FIELD OF THE INVENTION

The present invention relates to a back light module, and more particularly to a back light module which can be easily assembled and a display device using the same.

BACKGROUND OF THE INVENTION

Figure 1A:
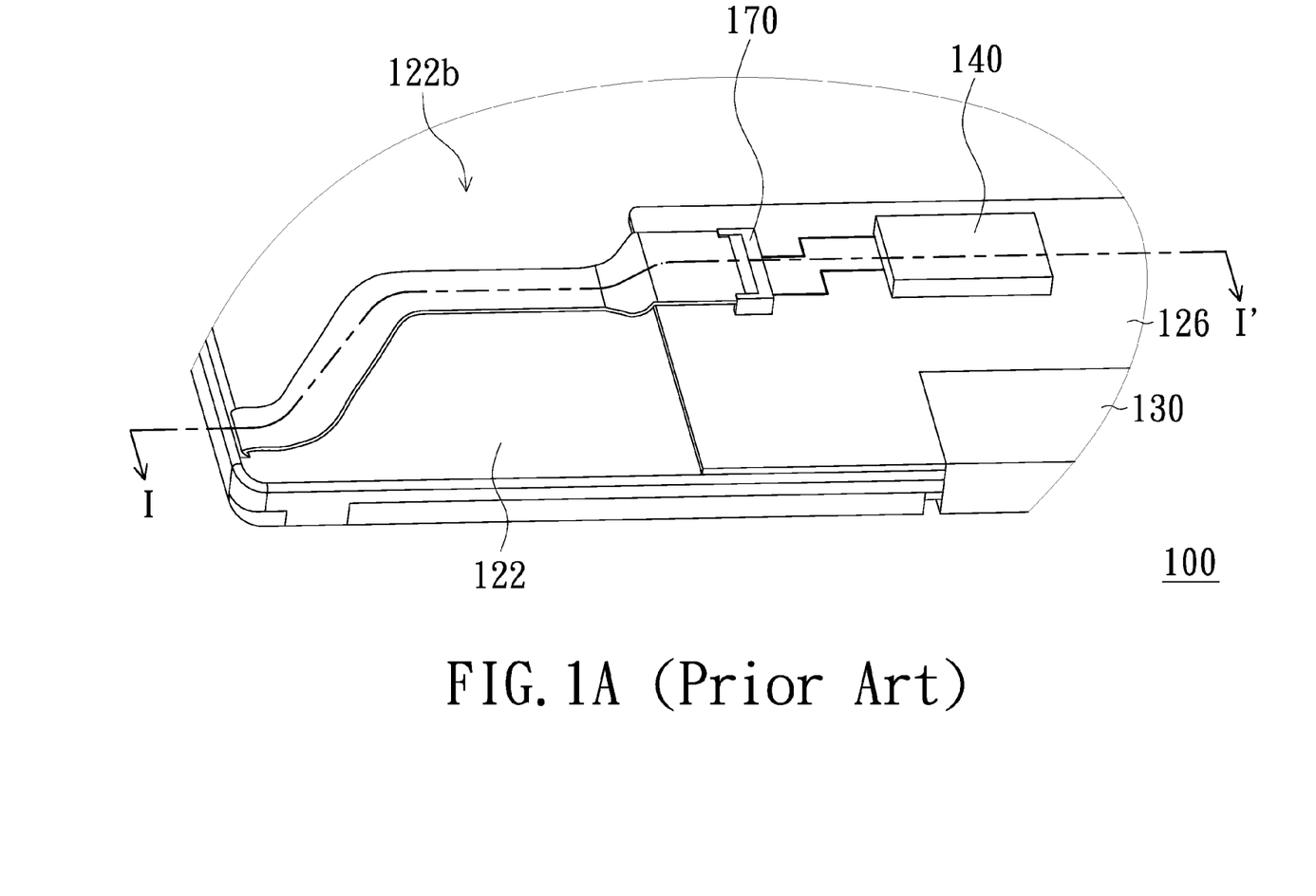
FIG. 1A illustrates a schematic partial three-dimensional view of a conventional back light module.
Figure 1B:
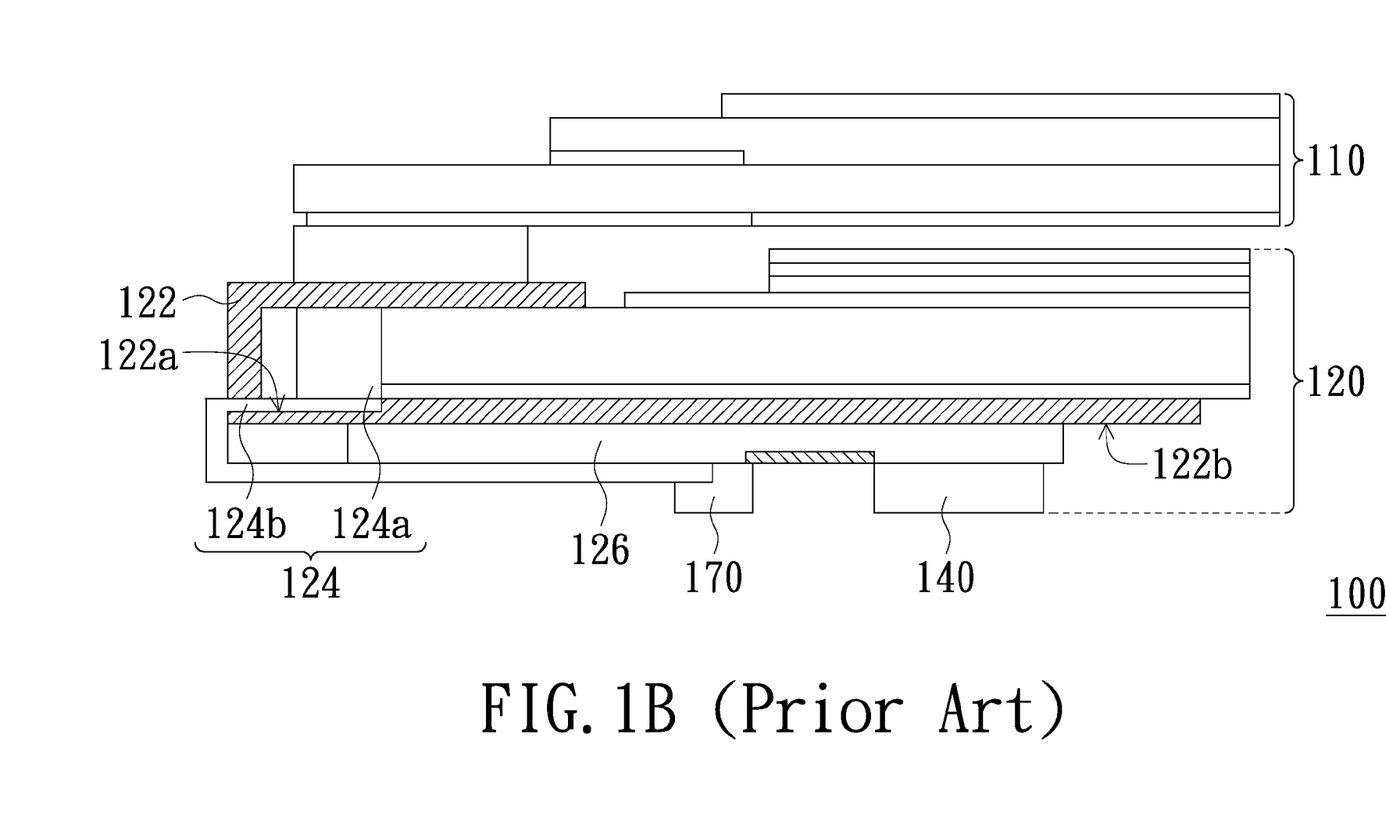
FIG. 1B illustrates a schematic cross-sectional view of the conventional back light module taken along line I-I' of FIG. 1A.

FIG. 1A shows a schematic partial three-dimensional view of a conventional back light module, and FIG. 1B shows a schematic cross-sectional view of the conventional back light module taken along line I-I' of FIG. 1A. Referring to FIG. 1A and FIG. 1B, a display device 100 includes a display panel 110 and a back light module 120, and the display panel 110 is disposed on the back light module 120. The back light module 120 includes a bezel 122, a light source assembly 124 and a driving circuit board 126, wherein the bezel 122 has a carrier surface 122a and a back surface 122b opposite to the carrier surface 122a, and a light source assembly 124 is disposed on the carrier surface 122a of the bezel 122.

Owing to the light emitting diode having several advantages such as high brightness, low power consumption, long usage life, and low heat generation, the light emitting diode is broadly used as the back light source of the liquid crystal display device. The light source assembly 124 has several light emitting diodes 124a and a circuit board 124b, wherein the light emitting diodes 124a are electrically connected to the circuit board 124b. In addition, the driving circuit board 126 is disposed on the back surface 122b of the bezel 122 and electrically connected to the circuit of the display panel 110 through a flexible circuit board 130. A chip 140 for driving the light source assembly 124 and a chip (not shown) for driving the display panel 110 are electrically connected to the driving circuit board 126. The circuit board 124b of the light source assembly 124 is electrically connected to the driving circuit board 126 by a connector 170 such that the light emitting diodes are electrically connected to the chip 140.

However, the assembly process of the display device 100 is complex and time consuming because the circuit board 124b must be pulled out from a lateral side of the bezel 122 and bent to a side of the back surface 122b of the bezel 122, and then the circuit board 124b is plugged into the connector 170 to electrically connect the circuit board 124b and the driving circuit board 126. In addition, the circuit board 124b may be broken due to the bent part of the circuit board 124b is repeatedly bent or nibs against other elements. It will affect the connection of the light source assembly 124 and chip 140 and result in the problem of abnormal display in the device.

SUMMARY OF THE INVENTION

An embodiment of the present invention provides a back light module including a bezel, a first circuit board, and a light source assembly. The bezel has a carrier surface, a first back surface and at least one through hole, wherein the carrier surface and the first back surface are opposite to each other, and the through hole passes through the bezel from the carrier surface to the first back surface. The first circuit board is disposed on the first back surface of the bezel and has a first wiring surface and a second back surface opposite to the first wiring surface. The second back surface faces to the first back surface, and the first circuit board has at least one first conductive pin set disposed on the second back surface.

The light source assembly is disposed on the carrier surface of the bezel and includes a second circuit board and a plurality of light emitting elements. The second circuit board includes a circuit layout and at least one second conductive pin set. The second circuit board has a second wiring surface and a third back surface opposite to the second wiring surface. The third back surface faces to the carrier surface, the layout is located on the second wiring surface, and the second conductive pin set is located on the third back surface and electrically connected to the first conductive pin set via the through hole of the bezel. The circuit layout is located on the second wiring surface and electrically connected to the second conductive pin set. The light emitting elements are disposed on the second wiring surface of the second circuit board and electrically connected to the circuit layout.

An embodiment of the present invention provides a display device which includes the above-mentioned back light module and a display panel disposed above the back light module.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
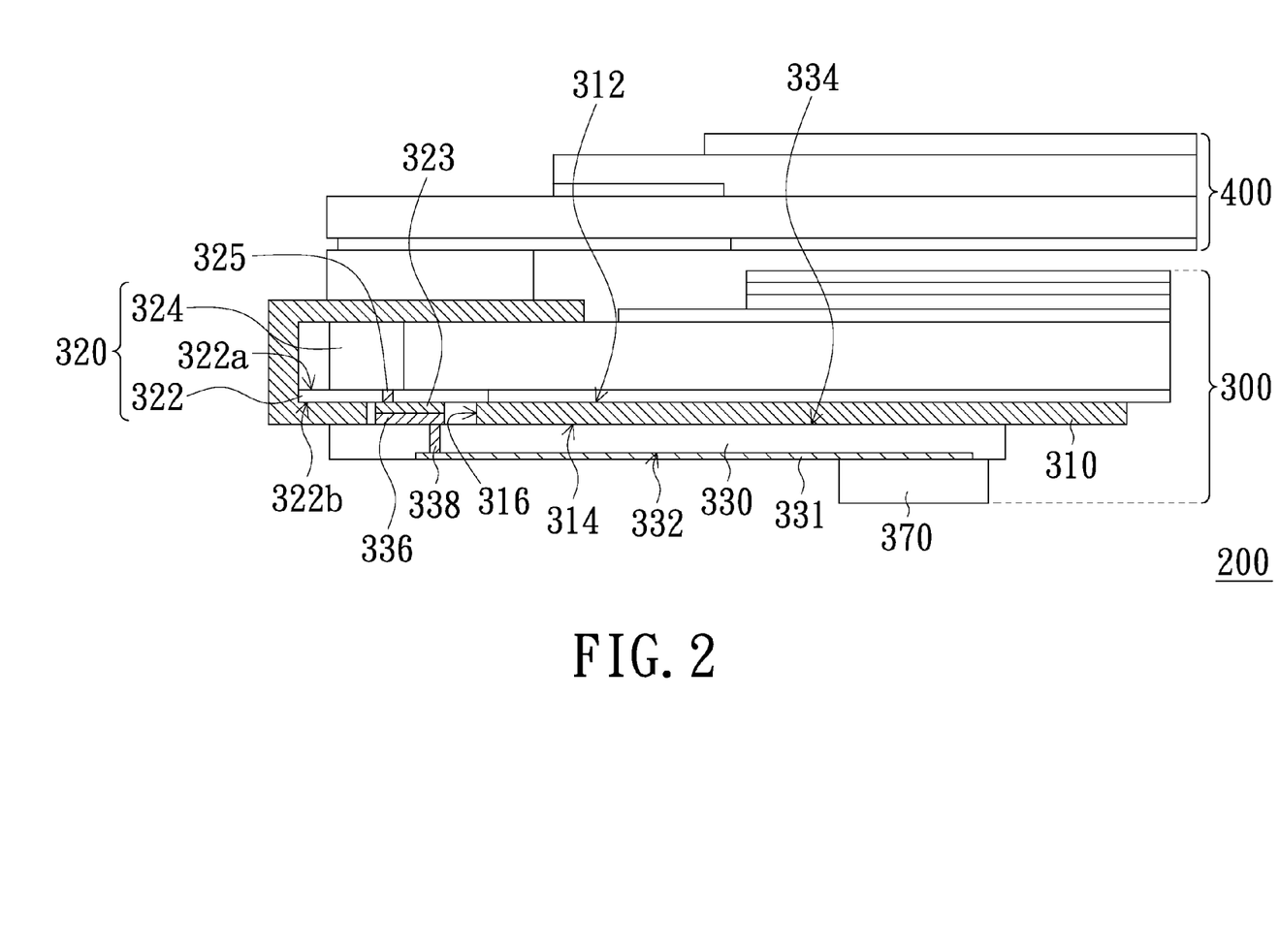
FIG. 2 illustrates a schematic cross-sectional view of a display device according to an embodiment of the present invention.

FIG. 2 shows a schematic cross-sectional view of a display device according to an embodiment of the present invention. Referring to FIG. 2, the display device 200 includes a back light module 300 and a display panel 400, wherein the display panel 400 is disposed above the back light module 300. The display panel 400 may be a liquid crystal display panel.

Figure 3:
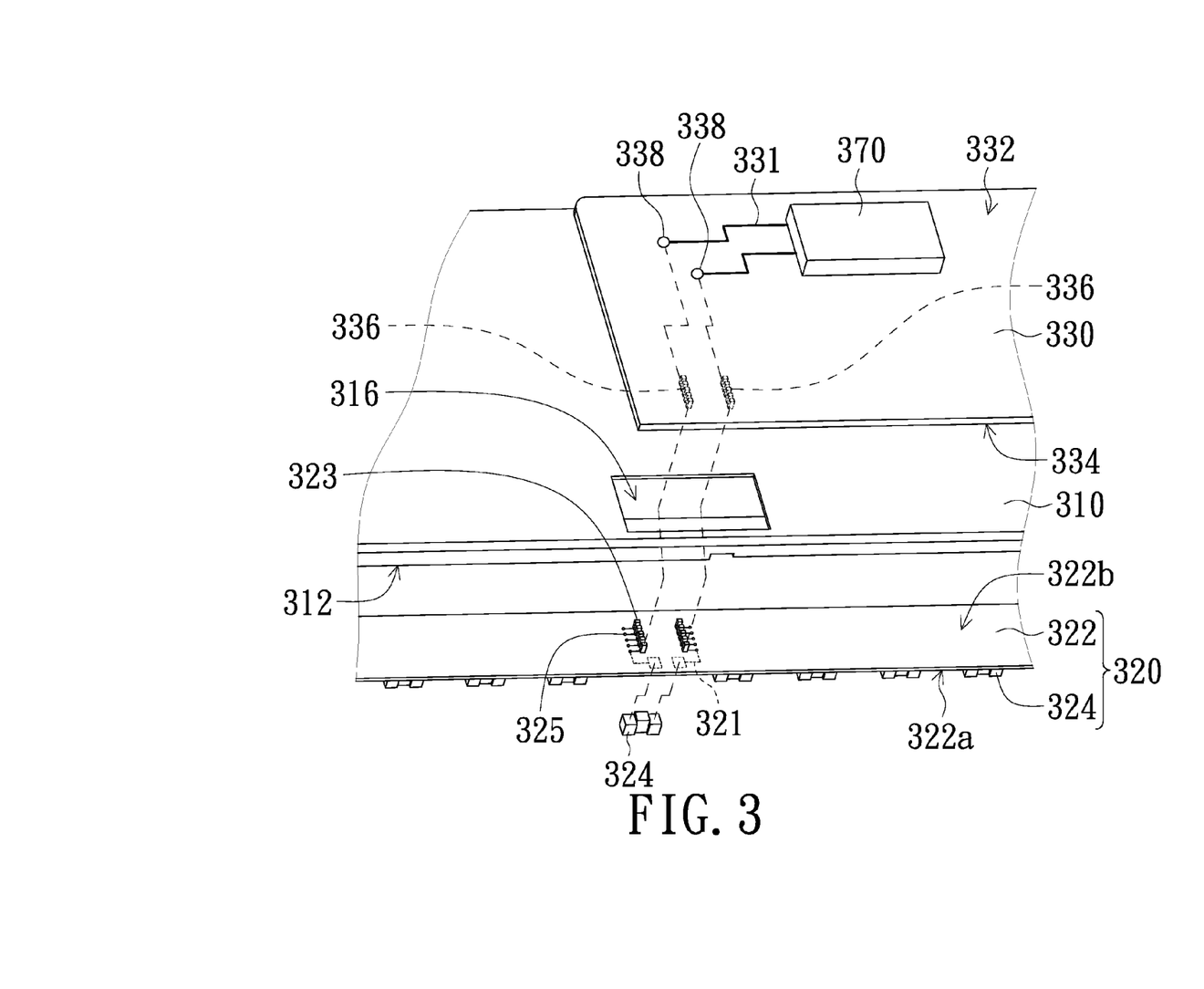
FIG. 3 illustrates a schematic partial exploded view of a back light module of the display device of FIG. 2.

FIG. 3 shows a schematic partial exploded view of the back light module of the display device of FIG. 2. Referring to FIG. 2 and FIG. 3, the back light module 300 includes a bezel 310, a light source assembly 320 and a first circuit board 330. The bezel 310 has a carrier surface 312, a first back surface 314 opposite to the carrier surface 312, and at least one through hole 316 passing through the bezel 310 from the carrier surface 312 to the first back surface 314. The first circuit board 330 is disposed on the first back surface 314 of the bezel 310 and has a first wiring surface 332 and a second back surface 334 opposite to the first wiring surface 332, wherein the second back surface 334 faces to the first back surface 314 of the bezel 310. More specifically, the first circuit board 330 may be a printed circuit board (PCB) which carries a driving chip (not shown) for the display panel 400 and a driving chip 370 for the light source assembly 320. Therefore, a circuit layout 331 having several conductive patterns is formed on the first wiring surface 332 of the first circuit board 330. The driving chip 370 for driving the light source assembly 320 and the driving chip for driving the display panel 400 are disposed on the first wiring surface 332 and electrically connected to the circuit layout 331. In addition, the first circuit board 330 may be electrically connected to an internal circuit of the display panel 400 by a flexible print circuit board (not shown). The back light module 300 may further include a light guide plate and at least an optical film which are adjacent to the light source assembly 320.

The first circuit board 330 further includes a first conductive pin set 336 disposed on the second back surface 334. In this embodiment, the first conductive pin set 336 corresponds to the through hole 316 of the bezel 310, and the first conductive pin set 336 is exposed from the carrier surface 312 via the through hole 316. Moreover, the circuit layout 331 includes a conductive via hole 338 electrically connected to the first conductive pin set 336. The conductive via hole 338 passes through the bezel 310 from the first wiring surface 332 to the second back surface 334 and is filled with conductive material.

The light source assembly 320 is disposed on the carrier surface 312 of the bezel 310 and includes a second circuit board 322 and a plurality of light emitting elements 324. In this embodiment, the light emitting elements 324 may be light-emitting diodes, and the second circuit board 322 is a driving circuit board for the light emitting elements 324. More specifically, the second circuit board 322 includes a circuit layout 321 and at least one second conductive pin set 323, wherein the circuit layout 321 is used for transmitting driving signals to the light emitting elements 324. The light emitting elements 324 are disposed on the second circuit board 322 and electrically connected to the circuit layout 321. Furthermore, the second conductive pin set 323 is used for electrically connecting the circuit layout 321 to an external circuit.

The second circuit board 322 has a second wiring surface 322a and a third back surface 322b opposite to the second wiring surface 322a, wherein the third back surface 322b faces to the carrier surface 312 of the bezel 310. The light emitting elements 324 and the circuit layout 321 are located on the second wiring surface 322a, and the second conductive pin set 323 is located on the third back surface 322b. In addition, the circuit layout 321 further includes at least one conductive via hole 325 that passes through the bezel 310 from the second wiring surface 322a to the third back surface 322b and is electrically connected to the second conductive pin set 323. The second conductive pin set 323 corresponds to the through hole 316 of the bezel 310. In other words, the second conductive pin set 323 is exposed from the first back surface 314 via the through hole 316 and electrically connected to the first conductive pin set 336 in the through hole 316.

In the back light module 300 of this embodiment, the second conductive pin set 323 of the second circuit board 322 disposed on the carrier surface 312 may be electrically connected to the first conductive pin set 336 of the first circuit board 330 disposed on the first back surface 314 via the through hole 316 of the bezel 310. In other words, a conductive wire extended from a lateral side of the bezel 310 to electrically connect the first circuit board 330 and the second circuit board 332 is omitted, thereby avoiding an electrical disconnection between the first circuit board 330 and the second circuit board 332 caused by a damage of the conductive wire.

Figure 4:
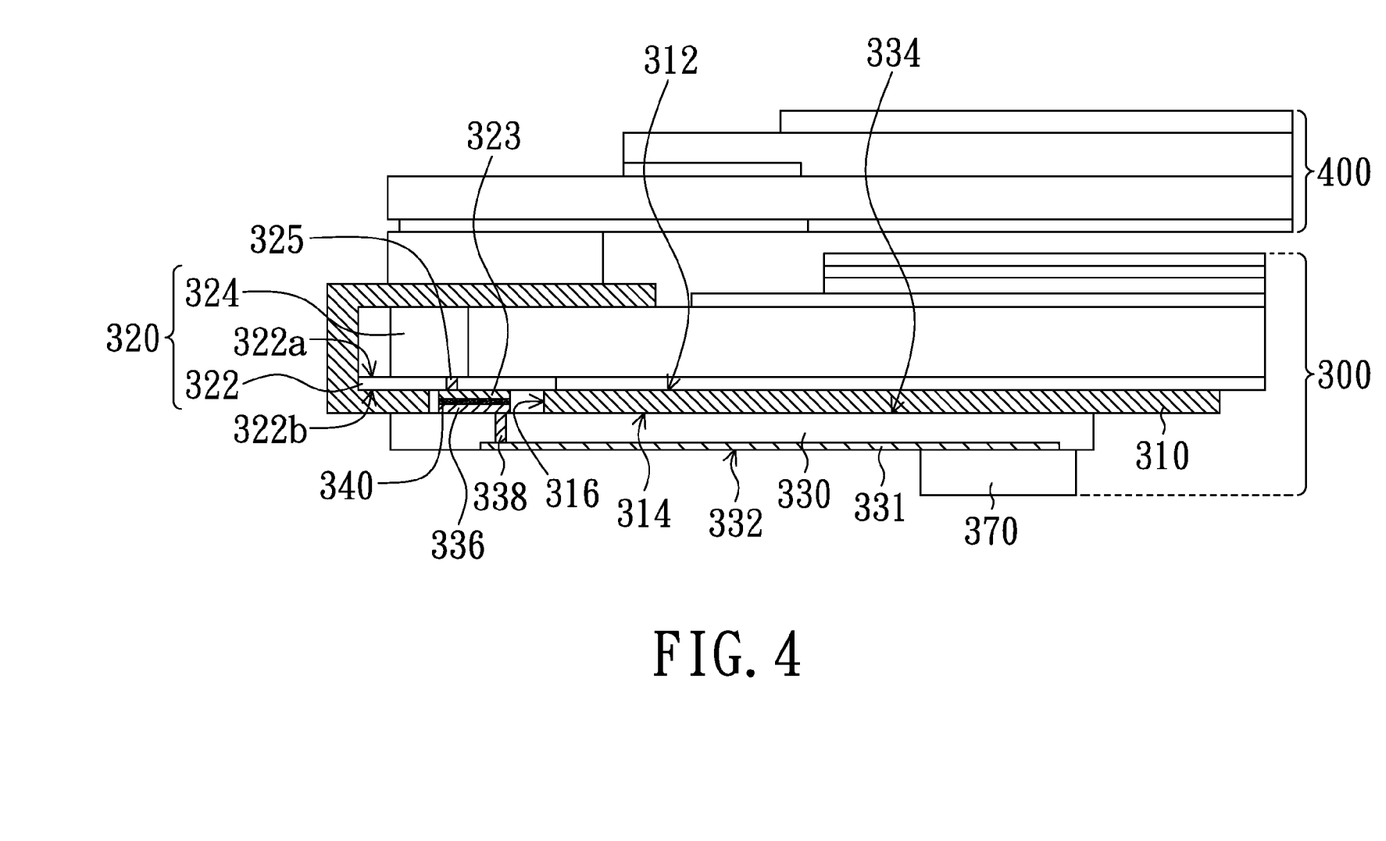
FIG. 4 illustrates a schematic partial cross-sectional view of a back light module according to another embodiment of the present invention.

FIG. 4 shows a schematic partial cross-sectional view of a back light module according to another embodiment of the present invention. Referring to FIG. 4, a conductive adhesive 340 may be disposed between the first conductive pin set 336 and the second conductive pin set 323 in order to increase the conductibility between the first circuit board 330 and the second circuit board 322.

It should be noted that although the second circuit board 322 of above-mentioned embodiments includes only one second conductive pin set 323, the number of the second conductive pin set 323 of the invention is not limited to one. In fact, the second conductive pin set 323 is used for electrically connecting the light emitting elements 324 of the second circuit board 322 to the first circuit board 330. Thus, all the light emitting elements 324 can be electrically connected to one second conductive pin set 323 through the design of the circuit layout 321. In another embodiment, each of the light emitting elements 324 can be electrically connected to one corresponding second conductive pin set 323 through the different design of the circuit layout 321. Further, in the embodiment that all the light emitting elements 324 are electrically connected to one second conductive pin set 323, the second conductive pin set 323 includes several pairs of positive and negative pins, and each of the light emitting elements 324 is electrically connected to one corresponding pair of positive and negative pins.

Figure 5:
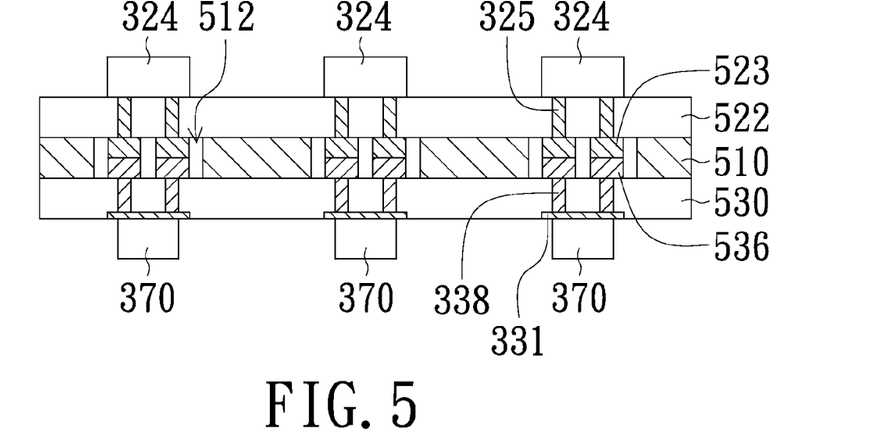
FIG. 5 illustrates a schematic partial cross-sectional view of a back light module according to another embodiment of the present invention.

FIG. 5 shows a schematic partial cross-sectional view of a back light module according to another embodiment of the present invention. Referring to FIG. 5, the second circuit board 522 may include several second conductive pin sets 523, and each of the light emitting elements 324 is electrically connected to one corresponding second conductive pin set 523 through the circuit layout 321. In this embodiment, each of the second conductive pin sets 523 has a pair of positive and negative pins. Accordingly, the first circuit board 530 of the embodiment also include several first conductive pin sets 536 corresponding to the second conductive pin sets 523 of the second circuit board 522, and the bezel 510 has several through holes 512. Each of the second conductive pin sets 523 is electrically connected to one corresponding first conductive pin set 536 via one corresponding through hole 512.

Figure 6:
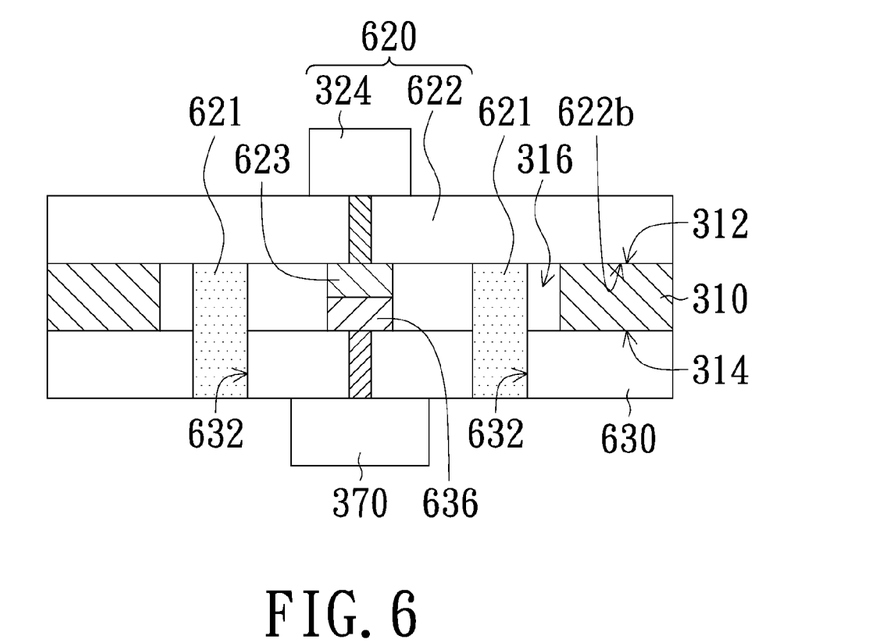
FIG. 6 illustrates a schematic partial cross-sectional view of a back light module according to another embodiment of the present invention.

FIG. 6 shows a schematic partial cross-sectional view of a back light module according to another embodiment of the present invention. Referring to FIG. 6, the first circuit board 630 may have a positioning hole 632 adjacent to the first conductive pin set 636, and the second circuit board 622 may correspondingly include a positioning bump 621. The positioning bump 621 is disposed on the third back surface 622b of the second circuit board 622 and adjacent to the second conductive pin set 623. In the assembly process of the back light module, the light source assembly 620 is disposed on the carrier surface 312 of the bezel 310. Then, the positioning hole 632 may align the positioning bump 621 exposed from the through hole 316 of the bezel 310 when the first circuit board 630 is disposed on the first back surface 314 of the bezel 310. Finally, the positioning bump 621 is jointed to the positioning hole 632 so that alignment and assembly of the first circuit board 630 on the bezel 310 is completed.

Figure 7:
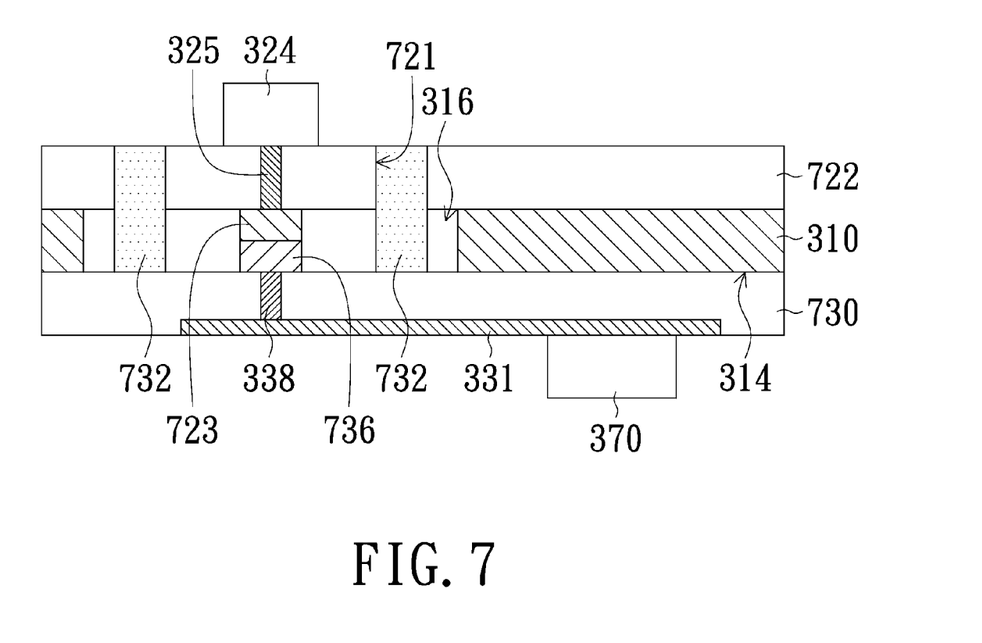
FIG. 7 illustrates a schematic partial cross-sectional view of a back light module according to another embodiment of the present invention.

It should be noted that the positioning manner between the first circuit board and the second circuit board is not limited to FIG. 6. FIG. 7 shows a schematic partial cross-sectional view of a back light module according to another embodiment of the present invention. Referring to FIG. 7, the first circuit board 730 may have a positioning bump 732 adjacent to the first conductive pin set 736 and the second circuit board 722 may have a positioning hole 721 adjacent to the second conductive pin set 723. When the first circuit board 730 is jointed to the second circuit board 722, the positioning bump 732 is jointed to the positioning hole 721.

In summary, in the back light module of the invention, the bezel having the through hole is used to carry the light source assembly, such that the conductive pin set of the circuit board of the light source assembly is exposed from the back surface of the bezel by the through hole. The driving circuit board of the back light module is disposed on the back surface of the bezel, and the conductive pin set of the driving circuit board is electrically connected to the conductive pin set of the circuit board of the light source assembly via the through hole of the bezel. In other words, a conductive wire is omitted which extended from a lateral side of the bezel to electrically connect the circuit board of the light source assembly and the driving circuit board of the back light module. Thus, the assembly process of the back light module may be simplified, thereby decreasing assembly time and avoiding an electrical disconnection between the light source assembly and the driving circuit caused by the damage of the conductive wire.

In addition, a connector is omitted because the conductive pin set of the driving circuit board is directly or indirectly electrically connected to the conductive pin set of the circuit board of the light source assembly via the through hole of the bezel, so that the manufacturing cost of the back light module may be decreased.

Owing to the display device having the above-mentioned back light module, the assembly process of the display device may be simplified, and thus, the assembly time and the cost of the display device can be decreased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A back light module, comprising:
  a bezel having a carrier surface, a first back surface and at least one through hole, the carrier surface and the first back surface being opposite to each other, and the through hole passing through the bezel from the carrier surface to the first back surface;
  a first circuit board disposed on the first back surface of the bezel and having a first wiring surface and a second back surface opposite to the first wiring surface, the second back surface facing to the first back surface, and the first circuit board having at least one first conductive pin set disposed on the second back surface; and
  a light source assembly disposed on the carrier surface of the bezel, and the light source assembly comprising:
    a second circuit board comprising a circuit layout and at least one second conductive pin set, the second circuit board having a second wiring surface and a third back surface opposite to the second wiring surface, the third back surface facing to the carrier surface, the circuit layout being located on the second wiring surface, the second conductive pin set being located on the third back surface and electrically connected to the first conductive pin set via the through hole of the bezel, and the circuit layout being located on the second wiring surface and electrically connected to the second conductive pin set; and
    a plurality of light emitting elements disposed on the second wiring surface of the second circuit board and electrically connected to the circuit layout;
  wherein the first circuit board has at least one positioning hole adjacent to the first conductive pin set, and the second circuit board further comprises a positioning bump disposed on the third back surface and adjacent to the second conductive pin set and joined to the positioning hole via the through hole.

2. The back light module according to claim 1, further comprising a conductive adhesive disposed between the first conductive pin set and the second conductive pin set.

3. The back light module according to claim 1, wherein the first circuit board comprises a plurality of the first conductive pin sets, the second circuit board comprises a plurality of the second conductive pin sets, the bezel has a plurality of the through holes, and each of the second conductive pin sets corresponds to one of the through holes and is electrically connected between one of the light emitting elements and one of the first conductive pin sets.

4. A back light module, comprising:
  a bezel having a carrier surface, a first back surface and at least one through hole, the carrier surface and the first back surface being opposite to each other, and the through hole passing through the bezel from the carrier surface to the first back surface;
  a first circuit board disposed on the first back surface of the bezel and having a first wiring surface and a second back surface opposite to the first wiring surface, the second back surface facing to the first back surface, and the first circuit board having at least one first conductive pin set disposed on the second back surface; and
  a light source assembly disposed on the carrier surface of the bezel, and the light source assembly comprising:
    a second circuit board comprising a circuit layout and at least one second conductive pin set, the second circuit board having a second wiring surface and a third back surface opposite to the second wiring surface, the third back surface facing to the carrier surface, the circuit layout being located on the second wiring surface, the second conductive pin set being located on the third back surface and electrically connected to the first conductive pin set via the through hole of the bezel, and the circuit layout being located on the second wiring surface and electrically connected to the second conductive pin set; and
    a plurality of light emitting elements disposed on the second wiring surface of the second circuit board and electrically connected to the circuit layout;
  wherein the first circuit board has at least one positioning bump disposed on the second back surface and adjacent to the first conductive pin set, the second circuit board has a positioning hole, and the positioning bump is joined to the positioning hole via the through hole.

5. The back light module according to claim 4, further comprising a conductive adhesive disposed between the first conductive pin set and the second conductive pin set.

6. The back light module according to claim 4, wherein the first circuit board comprises a plurality of the first conductive pin sets, the second circuit board comprises a plurality of the second conductive pin sets, the bezel has a plurality of the through holes, and each of the second conductive pin sets corresponds to one of the through holes and is electrically connected between one of the light emitting elements and one of the first conductive pin sets.

* * * * *